March 20, 1962    R. S. SCHWARTZ ETAL    3,025,763
ABSORPTION EDGE LIGHT VALVE INDICATOR SYSTEM
Filed June 26, 1959

INVENTOR
Robert S. Schwartz &
Milton Genser
BY Geoffrey Knight
ATTORNEY

United States Patent Office 3,025,763
Patented Mar. 20, 1962

3,025,763
ABSORPTION EDGE LIGHT VALVE
INDICATOR SYSTEM
Robert S. Schwartz and Milton Genser, Poughkeepsie, N.Y., assignors to International Business Machines Corporation, New York, N.Y., a corporation of New York
Filed June 26, 1959, Ser. No. 823,238
4 Claims. (Cl. 88—61)

This invention relates to an indicator device and more particularly to a device utilizing the temperature sensitive absorption edge of a thin semiconductive material.

Many elements such as sodium, cadmium or cadmium sulfide have been shown to give what is called an absorption spectrum when the light from a carbon arc is passed through the element. Excitation of the atoms of the element by radiant energy will cause certain wave lengths of the radiant energy to be absorbed. If, for example, light from a carbon arc is sent through one of these elements, and then examined with a spectroscope, there will be a series of dark lines in the spectrum corresponding to the wave lengths of light absorbed.

The dark lines of the absorption spectrum correspond to the absorption edge, which is defined as the wave length corresponding to an abrupt discontinuity in the intensity of an absorption spectrum.

An article by David Dutton entitled "Fundamental Absorption Edge in Cadmium Sulfide," Physical Review, vol. 112, No. 3, p. 785, shows that the absorption edge of cadmium sulfide may be accurately plotted and also that it may be caused to vary from one wave length to another by varying the temperature of the crystal.

It is therefore a general object of this invention to provide an indicator device utilizing the temperature sensitive absorption edge of a semiconductive material.

It is a further object of this invention to provide an indicator device requiring very little power to give the desired indications.

It is also an object of this invention to provide a device having very fast response to changes of conditions in the system utilizing the device.

It is yet another object of this invention to provide an indicator device easy to construct and maintain since no moving parts are required.

These and other objects are obtained by the use of a semiconductive material mounted on a transparent base and heater element. This unit is positioned between a source of monochromatic light of a visible wave length and the position where the indication is to be visible.

The monochromatic light is of a wave length slightly higher than the absorption edge of the semiconductive material at the steady-state temperature of the material, therefore not visible. As the temperature of the semiconductive material is increased, the absorption edge shifts to above the light wave length allowing the light to be visible through the material.

The foregoing and other objects, features and advantages of the invention will be apparent from the following more particular description of a preferred embodiment of the invention, as illustrated in the accompanying drawings.

Figure 1:
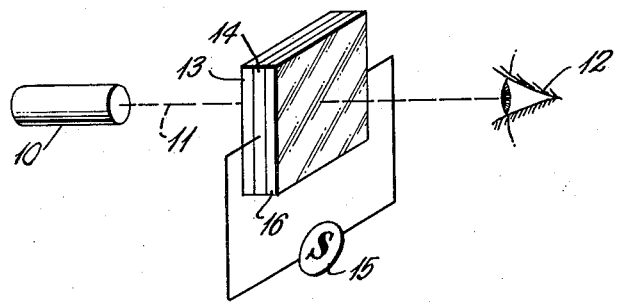
FIG. 1 depicts schematically an embodiment of this invention.

In FIG. 1 is shown a source 10 of monochromatic light 11. Positioned between the source 10 and the detection position 12 is a transparent substrate 13 such as glass. Mounted upon the substrate 13 is a transparent low thermal inertia heater element 14 such as Nesa glass which is conductive. The heater element 14 is caused to conduct, causing its temperature to rise, by the application of a potential to it by signal 15. Mounted on the heater element 14 is a layer of cadmium sulfide 16 approximately one-eighth inch thick.

Figure 2:
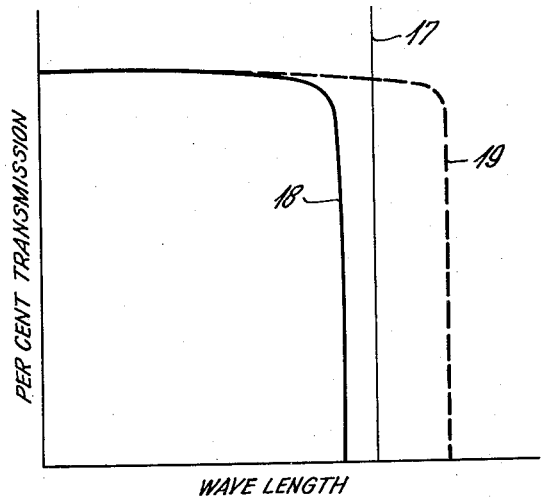
FIG. 2 shows in graph form an absorption edge and its variance with temperature utilized in the present invention.

Referring now to FIGS. 1 and 2, the monochromatic light 11 is chosen to have a wave length represented by the line 17. This wave length is chosen to place it just above the absorption edge 18 of cadmium sulfide at the steady state temperature of the crystal. As the crystal is heated in response to the potential applied to the heater element 14, the absorption edge shifts to the position shown by dotted line 19, and the light of wave length 17 now becomes visible through the crystal. Removing the signal 15 from the heater element 14 will bring the absorption edge back to the position shown by line 18 and the monochromatic light will not be visible. It is therefore possible to detect the presence or absence of a signal applied to the heater element 14 by shifting the absorption edge as shown in FIG. 2, in response to that signal.

The shift in the absorption edge is approximately 50 angstroms for a 10° change in temperature. Response time of the system will be dictated by the thickness of the semiconductive material and the thermal inertia of the heater element which will affect the time to heat and cool the elements. A thickness of about one-eighth inch for the absorption material will give a response time of 2–3 milliseconds.

Other materials exhibit the same features as cadmium sulfide in the preferred embodiment of this invention. Cadmium sulfide was chosen because its absorption edge falls within the visible wave lengths of light at approximately 5,000 angstroms (blue-green). Other materials could be used requiring special detection devices as their absorption edges could be in the ultraviolet or infrared regions.

The preferred embodiment of this invention shows an electrical signal indicator device. Utilizing the same concept as here shown, the device could be utilized as a means for detecting a change of temperature or a specific value of temperature. In a like manner, by holding the crystal's temperature constant, an accurate determination could be made of the presence of a specific wave length of light. By knowing the absorption edge, the light wave length could be varied in a monochromatizer until there is no indications of light through the crystal.

While the invention has been particularly shown and described with reference to a preferred embodiment thereof, it will be understood by those skilled in the art that various changes in form and details may be made therein without departing from the spirit and scope of the invention.

We claim:

1. An indicator device to provide indication at a specified location of one of two conditions of a system, comprising a source of monochromatic light, a transparent substrate positioned between said source of monochromatic light and the specified location, a layer of absorption material mounted on said substrate, said absorption material having a temperature sensitive absorption edge at the approximate wave length of said monochromatic light, and a transparent heating means contiguous with said material responsive to the conditions of a system to heat said absorption material whereby said absorption material will be opaque for one condition and transparent for the other condition to said monochromatic light.

2. A light valve comprising: a source of monochromatic light in the visible spectrum, a transparent electrically conductive heater element positioned in the path of said monochromatic light; a layer of cadmium sulfide mounted on said heater element, said cadmium sulfide having a temperature sensitive absorption edge at the approximate wave length of said monochromatic light; and means for selectively passing current through said heater element to heat said cadmium sulfide whereby said cadmium sulfide will be selectively opaque or transparent to said monochromatic light.

3. An indicator device to provide indication at a specified location of one of two conditions of a system comprising: a source of monochromatic light; a transparent electrically conductive heater element positioned between said source of monochromatic light and the specified location; a layer of absorption material mounted on said heater element, said absorption material having a temperature sensitive absorption edge at the approximate wave length of said monochromatic light; and current conducting means connected to said heater element, responsive to one of the two conditions of the system, to heat said absorption material whereby said absorption material will be opaque for one condition and transparent for the other condition to said monochomatic light.

4. An indicator device to provide indication at a specified location of one of two conditions of a system comprising: a source of monochromatic light; a transparent electrically conductive heater element positioned between said source of monochromatic light and the specified location; a layer of semiconductive absorption material deposited on said heater element, said absorption material having a temperature sensitive absorption edge at the approximate wave length of said monochromatic light; and current conducting means connected to said heater element, responsive to one of the two conditions of the system, to heat said absorption material whereby said absorption material will be opaque for one condition and transparent for the other condition to said monochromatic light.

References Cited in the file of this patent
UNITED STATES PATENTS

| | | |
|---|---|---|
| 2,666,583 | Whitney | Jan. 19, 1954 |
| 2,710,274 | Kuehl | June 7, 1955 |
| 2,750,832 | Morgan | June 19, 1956 |
| 2,824,235 | Hahn et al. | Feb. 18, 1958 |
| 2,964,619 | Hahn et al. | Dec. 13, 1960 |